(12) United States Patent
Egan

(10) Patent No.: US 6,804,922 B1
(45) Date of Patent: Oct. 19, 2004

(54) INTEGRAL COMPOSITE BUILDING MATERIAL AND USES THEREFOR

(75) Inventor: William F. Egan, Ponte Vedra Beach, FL (US)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 10/163,730

(22) Filed: Jun. 6, 2002

Related U.S. Application Data

(63) Continuation of application No. 09/627,932, filed on Jul. 28, 2000, now abandoned, which is a continuation-in-part of application No. 09/317,573, filed on May 24, 1999, now Pat. No. 6,131,353.
(60) Provisional application No. 60/087,852, filed on Jun. 3, 1998.

(51) Int. Cl.$^7$ ................................................. E04B 2/00
(52) U.S. Cl. ...................... 52/408; 52/411; 52/309.1; 52/309.8; 52/746.1
(58) Field of Search ........................... 52/408, 411, 413, 52/309.1, DIG. 16, 309.8, 518, 515, 746.1, 746.11

(56) References Cited

U.S. PATENT DOCUMENTS

| | | |
|---|---|---|
| 2,200,031 A | 5/1940 | Lee |
| 2,214,183 A | 9/1940 | Seymore |
| 2,704,500 A | 3/1955 | Bonforte |
| 3,687,759 A | 8/1972 | Werner et al. |
| 3,691,004 A | 9/1972 | Werner et al. |
| 3,754,362 A | 8/1973 | Daimler et al. |
| 3,949,657 A | 4/1976 | Sells |
| 4,019,326 A | 4/1977 | Herveling et al. |
| 4,024,719 A | 5/1977 | Risseeuw |
| 4,212,692 A | 7/1980 | Rasen et al. |
| 4,315,392 A | 2/1982 | Sylvest |
| 4,815,963 A | 3/1989 | Berkhout |
| 4,840,515 A | 6/1989 | Freese |
| 4,942,699 A | 7/1990 | Spinelli |
| 4,943,185 A | 7/1990 | McGuckin et al. |
| 4,946,310 A | 8/1990 | Wunderatzke |
| 4,955,760 A | 9/1990 | Payne |
| 5,099,627 A | 3/1992 | Coulton et al. |
| 5,218,798 A | 6/1993 | Bentivegna |
| 5,230,189 A | 7/1993 | Sourlis |
| 5,230,192 A | 7/1993 | Webb et al. |
| 5,287,673 A | 2/1994 | Kreikemeier |
| 5,481,838 A | 1/1996 | Fishel et al. |
| 5,518,799 A * | 5/1996 | Finestone et al. ............ 428/137 |
| 5,598,673 A | 2/1997 | Atkins |
| 5,617,687 A | 4/1997 | Bussey, Jr. et al. |
| 5,902,432 A * | 5/1999 | Coulton et al. .............. 156/199 |
| 5,960,595 A * | 10/1999 | McCorsley, III et al. ...... 52/199 |
| 6,128,879 A | 10/2000 | Bussey, Jr. et al. |
| 6,355,333 B1 | 3/2002 | Waggoner et al. |

FOREIGN PATENT DOCUMENTS

| | | |
|---|---|---|
| DE | 4137310 A1 | 5/1993 |
| DE | 4311357 A1 | 10/1994 |
| DE | 4431976 A1 | 3/1995 |
| EP | 0 526 848 A2 | 3/1993 |
| NL | 7707355 A | 1/1979 |
| WO | WO 99/14442 | 3/1999 |

* cited by examiner

Primary Examiner—Carl D. Friedman
Assistant Examiner—Jennifer I. Thissell
(74) Attorney, Agent, or Firm—Renner, Kenner, Greive, Bobak, Taylor & Weber

(57) ABSTRACT

A composite building material for preventing water and moisture from remaining trapped within walls and roofs of building which includes a weather barrier fixedly attached to a three-dimensional matrix filamentous mat manufactured of a polymeric material. The mat contains a great number of voids for permitting gas and liquid such as water to flow therethrough. The mat possesses a crush-resistance which allows the mat to withstand the compressive of other building materials without inhibiting the ability of the mat to allow liquids and gases to flow therethrough.

27 Claims, 5 Drawing Sheets

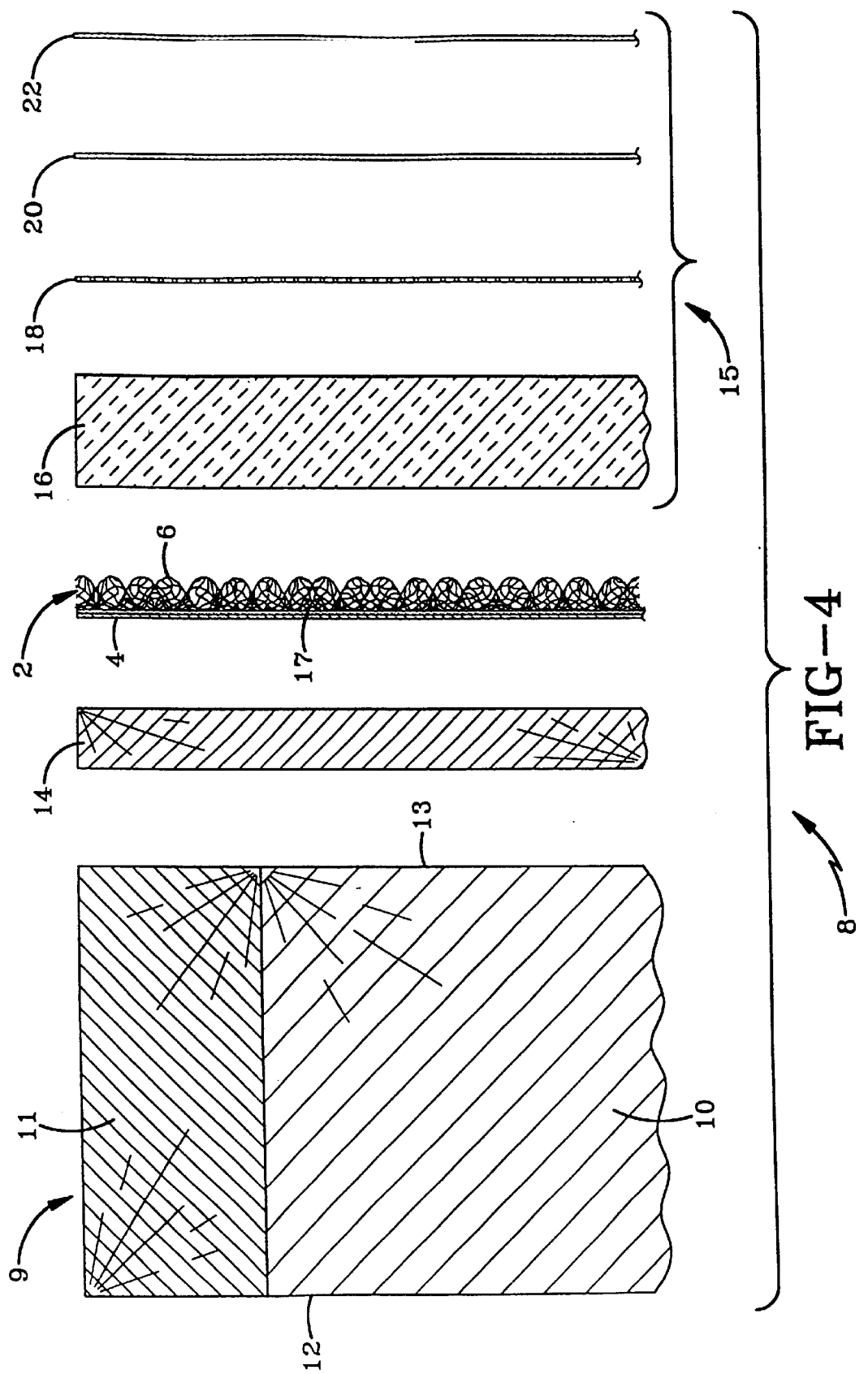

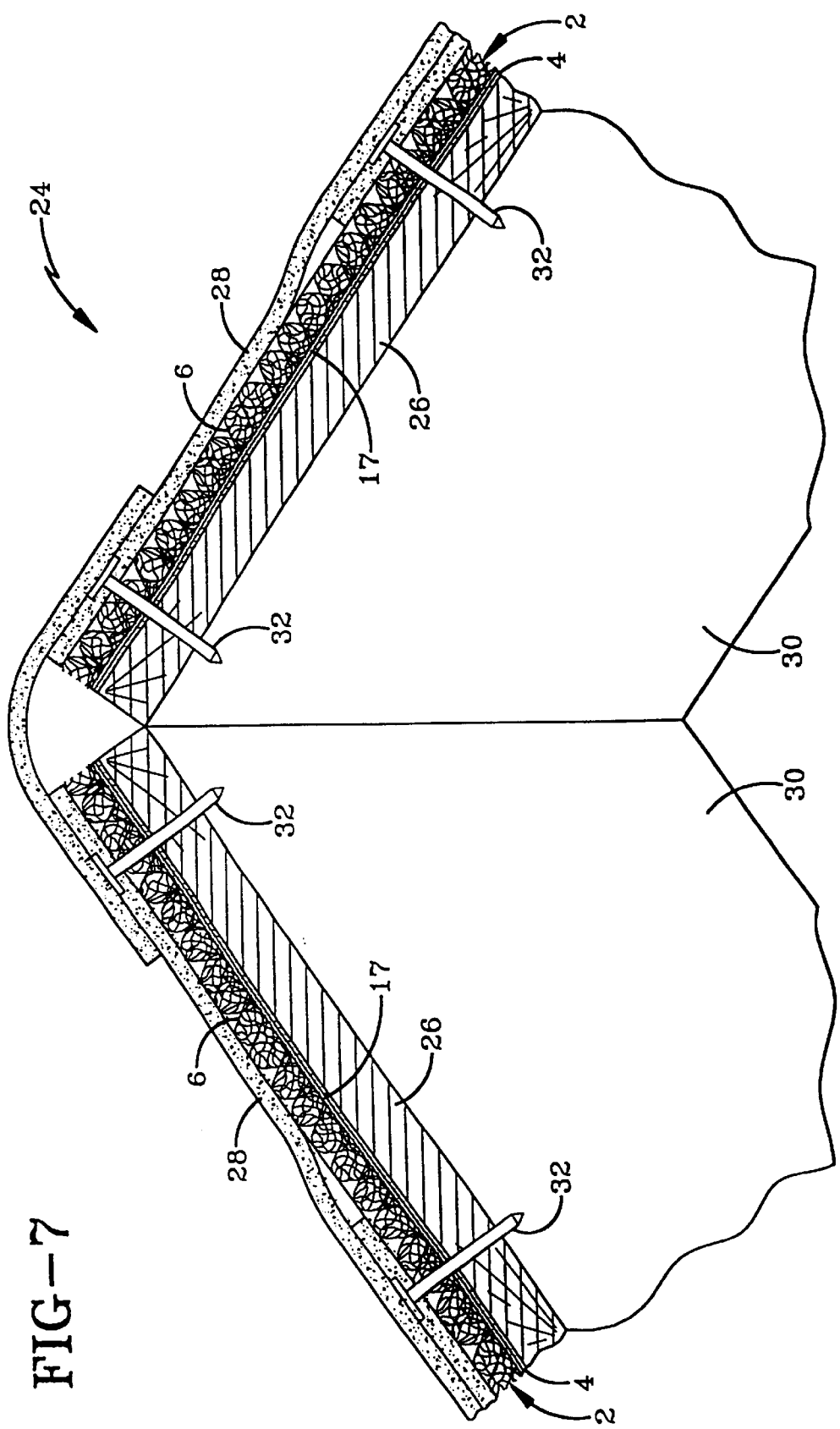

INTEGRAL COMPOSITE BUILDING MATERIAL AND USES THEREFOR

CROSS REFERENCE TO RELATED APPLICATIONS

This application is a continuation of U.S. Ser. No. 09/627,932, filed Jul. 28, 2000 now abandoned, which is a continuation-in-part of U.S. Ser. No. 09/317,573, filed May 24, 1999, now U.S. Pat. No. 6,131,353, which claims benefit of the filing date under 35 U.S.C. §119(e) of United States Provisional Application for Patent No. 60/087,852, filed on Jun. 3, 1998.

BACKGROUND OF THE INVENTION

1. Technical Field

The invention relates generally to an improved weather barrier used in building construction. More particularly, the invention relates to an improved weather barrier that additionally provides a mat to facilitate the drainage of liquid water and water vapor from internal portions of building walls and roofs. Specifically, the invention relates to an improved weather barrier which is installed between the framed walls and the external wall covering or between the roof decking and the shingles or roof covering of a building for the purpose of providing a combination weather resistant barrier and water drainage system and allowing for expedited installation thereof.

2. Background Information

Modern techniques for constructing the walls of buildings may take numerous forms. Among these is two-by-four (2×4) framed construction. The present invention could, however, be equally used with any type of construction known presently or in the future.

As is well known in the relevant art, conventional 2×4 wall construction begins with framing of the walls with wood or steel members. These wood or steel members typically have nominal dimensions of 2"×4" and are, therefore, called "two-by-four" or 2×4. These 2×4's are oriented vertically and spaced at intervals generally either 16" or 24" and are each connected at the top and bottom to similar members horizontally oriented. This structure is referred to in the relevant art as a "framed" wall.

As is well understood in the art, a sheet of sheathing such as plywood or other material is then often applied to the exterior of the framed wall, but may not be required in all circumstances. Such requirements are typically established by governmental building codes. A weather barrier is then typically applied to the exterior of the sheathing, with an external wall covering then being applied directly over the weather barrier. Myriad materials may be used for the external wall covering such as brick, stucco, Exterior Insulation and Finish System (EIFS), vinyl or aluminum siding, wood, etc. A sheet of gypsum board or drywall is typically applied to the interior surface of the framed wall toward the living area.

When completed, the structure may be said to have a "building envelope" which would include any component intended to prevent the flow of water and moisture from the external environment into the structure. As such, the building envelope will include the external wall covering, roof, and windows, as well as other such components typically found in such structures. A breach or void in any portion of the building envelope may result in the flow of water or moisture into the structure, a condition which is to be avoided.

If any such water or moisture should penetrate the building envelope, the weather barrier mentioned above serves as an additional obstacle to the intrusion of such water or other elements onto the sheathing material and into the wall. If water is permitted to flow through the weather barrier and onto the sheathing material, the water will typically remain trapped between the weather barrier and the sheathing material, which may result in speedy deterioration of the sheathing material, thus requiring replacement. Moreover, moisture from the environment may become trapped between the external wall covering and the weather barrier. In the latter circumstance, if the weather barrier contains significant voids, cuts, gaps, etc., whether incurred during construction or due to settling of the structure, any such moisture may find its way through the opening in the weather barrier, onto the sheathing material, and eventually into the wall with the deleterious effects described above. Additionally, such water can freeze in the winter resulting in freeze-thaw cycle-related damage to the structure. Moreover, such trapped moisture can reduce the wall system components' serviceability and service life. Thus, it is desired, as much as possible, to eliminate moisture entrapment between the wall covering and the weather barrier and to prevent the formation of breaches in the weather barrier.

It is additionally desired to prevent water from becoming trapped inside walls and roofs. As is known in the art, modern construction techniques may additionally include the installation of a mat between the weather barrier and the external wall covering. Such a mat may be constructed of a thermoplastic polyamide resin such as nylon, the filaments of which may be heat fused to one another at randomly spaced points to form a three-dimensional, convoluted and mutually interconnected filamentatious body. The construction of such a mat is well known in the art and is set forth, for example, in U.S. Pat. Nos. 3,687,759, 3,691,004, and 4,212,692. Other methods and materials may, of course, be used to construct a drainage mat.

As is set forth in U.S. Pat. Nos. 3,687,759, 3,691,004, and 4,212,692, the mat may be a low density matting article having a primary matting layer consisting essentially of a plurality of continuous melt-spun synthetic polymer filaments of a diameter of about 0.1 to 1.5 mm., preferably between about 0.2 and 1.0 mm., laid in overlapping rows of irregularly looped and intermingled filaments to form a peak and valley three-dimensional sheet structure undulating in the longitudinal and/or transverse directions of the matting, the individual filaments in the structure being self-bonded at random points of intersection, and having a secondary layer consisting of a substantially flat, thin non-woven web of synthetic polymer filaments melt-spun as a separate sheet and then applied onto one of the undulating faces of the primary matting layer while still tacky such that the surface filaments of the non-woven web become bonded to part of the filaments of the primary matting layer at mutual points of intersection. The primary matting layer can be formed by extruding the melt of a synthetic polymer through a plurality of spinning orifices arranged in rows on the bottom face plate of a spinning nozzle such that a corresponding plurality of melt-spun filaments fall vertically downwardly onto a moving support intersecting the filaments at a distance of about 3 to 20 cm, preferably 3 to 9 cm, below the spinning plate. The moving support exhibits a profile having projections corresponding to the desired depth of the matting and arranged to provide a patterned reentrant supporting surface with uppermost salient portions onto which the filaments are first directed and supported so as to form the peaks of the matting structure and with downwardly opening reentrant areas between the salient portions into which filamentary loops are directed both longitudinally and transversely so as to form the valleys of the matting structure, the filaments from adjacent spinning orifices overlapping and self-bonding with each other at random points of intersection. The secondary matting can be formed by spinning a melt of synthetic polymer from an additional set of spinning orifices onto a second and different moving support having an essentially smooth and even surface structure, thereby forming a substantially flat non-woven web of overlapped filamentary loops self-bonded at random points of intersection. The non-woven web is transferred while still tacky from the second moving support directly onto the free surface of the primary matting such that part of the tacky surface filaments in the contacting face portions of the web and the matting adhere to one another at mutual points of intersection. The combined web and matting are then cooled to firmly bond the adhered filaments to one another.

The mat may be the same as or similar to ENKAMAT® Type 7005 manufactured by Akzo Nobel Geosynthetics Company of Asheville, N.C., although other mats could be used.

The mat set forth above contains numerous voids through which water and air may flow. Moreover, the mat possesses a natural crush resistance resulting from its three-dimensional mutually interconnected character.

As is known in the relevant art, the external wall covering is then installed directly over the exposed drainage mat which has, itself, been installed directly over the weather barrier. As such, the drainage mat interposed between the external wall covering and the weather barrier creates a space through which water and air can flow between the external wall covering and the weather barrier. Thus, water which might have penetrated the external wall covering would flow downward through the mat and would be drained away through appropriate drain holes built into the bottom of the wall. Likewise, the mat allows for ventilation between the external wall covering and weather barrier, thereby inhibiting the formation of trapped moisture resulting from moist air or from other mechanism such as breaches in the building envelope.

The crush resistance of the drainage mat described above allows the drainage mat to retain an air space between the external wall covering and the weather barrier despite a compressive force therebetween. Such a compressive force may result from the use of mechanical fasteners such as nails, screws, staples, and the like to attach the external wall covering to the drainage mat and the wall. Such compressive forces may likewise result from wind loading on the external wall covering. Thus, if such mechanical fasteners are used to attach the external wall covering to a building, the natural crush resistance of the drainage mat will inhibit the compressive force from completely closing the air space created by the drainage mat. As such, the use of such mechanical fasteners does not inhibit the functionality of the drainage mat.

This method of construction utilizing both a weather barrier and a drainage mat between the weather barrier and external wall covering of a wall is equally applicable to roofing systems, as is set forth in U.S. Pat. Nos. 5,099,627 and 5,230,192. Thus, the use generally of a drainage mat in conjunction with a weather barrier, as used in building construction, is known in the relevant art.

Nevertheless, obstacles exist to the installation of both a weather barrier and a drainage mat in building construction. Chief among these are increased costs and increased construction time. As is presently understood in the relevant art, the installation of a drainage mat to the exterior of a weather barrier requires a second construction step, i.e., after the weather barrier has been installed, the drainage mat must then be installed directly thereover. Such a second procedure requires at least as much time and effort as were required to install the weather barrier. Thus, the installation of a drainage mat requires significant added effort in the construction process. Moreover, inasmuch as building materials typically arrive at a construction site in a tightly scheduled and ordered fashion, the installation of a drainage mat over a weather barrier results in an additional step which must be planned and executed according to schedule, otherwise construction procedures scheduled thereafter may be delayed with the result that construction workers and/or materials may sit idle for a time.

Moreover, the installation of flexible materials onto a vertical surface such as a wall is tedious and time consuming. Often such installation requires multiple workers and devices such as ladders, scaffolds, and the like. While this is particularly so with applications of a drainage mat to a vertical wall, such time and expense are similarly incurred in the installation of a drainage mat onto a roof, inasmuch as roofs are typically pitched at some angle to the horizontal and additionally are elevated above the grade.

As such, the installation of a drainage mat over a weather barrier in building construction requires significant additional time and expense. Thus, the need exists for a composite building material, which is economical to install and provides its intended benefits.

SUMMARY OF THE INVENTION

It is, therefore, an object of the present invention to provide a composite building material comprising a weather barrier attached to a polymeric mat.

It is another object of the present invention to provide a composite building material that can be installed more quickly than individual weather barriers and drainage mats.

It is another object of the present invention to provide a composite building material that permits enhanced integrity of the weather barrier.

It is another object of the present invention to provide a method of building a structure to include a composite building material as a component disposed between the building structure and the external covering.

These and other objectives and advantages of the invention are obtained from the improved composite drainage mat, the general nature of which can be stated as including a weather barrier and a mat attached to one another.

The present invention, therefore, provides a composite building material for use in a building structure, said building material comprising: a polymeric weather barrier; a mat formed of an open, three dimensional matrix of plastic filaments formed in an overlapping irregular looped and intermingled fashion; and a securement means for attaching the mat to the weather barrier to form said composite building material.

The securement means may be chosen from (i) a plurality of spaced adhesive spots, (ii) a plurality of substantially parallel adhesive strips, or (iii) a heat lamination.

The present invention also provides a method for constructing a building structure comprising: providing a plurality of spaced studs; securing a sheathing to the studs; providing a composite building material comprising an integral unitary member including a polymeric weather barrier, a mat formed of an open, three dimensional matrix of plastic filaments formed in an overlapping irregular looped and intermingled fashion and a securement means for attaching the drainage mat to the weather barrier; securing the composite building material to said sheathing; and securing an external covering to the studs with the composite building material being sandwiched between said sheathing and external covering.

BRIEF DESCRIPTION OF THE DRAWINGS

The preferred embodiment of the invention, illustrative of the best modes in which applicant has contemplated applying the principles of the invention, are set forth in the following description and are shown in the drawings.

FIG. 4 is an exploded sectional view of the upper part of a wall into which is incorporated the composite building material of the present invention;

FIG. 7 is a sectional view of a roof into which is incorporated the composite building material of the present invention.

Similar reference numbers refer to similar parts throughout the specification.

DESCRIPTION OF THE PREFERRED EMBODIMENT

The improved composite building material of the present invention is indicated generally by the numeral 2, and is particularly shown in FIGS. 1–7. Composite building material 2 includes a weather barrier 4 and a mat 6. Composite building material 2 is intended to be implemented into the construction of walls and/or roofs of buildings and is intended to supplant the installation of individual weather barriers and mats therein.

Weather barrier 4 may be a conventional weather barrier used in building construction and well known and understood in the relevant art such as building or tar paper, although other materials can be used without departing from the spirit of the present invention. Weather barrier 4 is a building code recognized product which is typically sold on a roll. Weather barrier 4 resists the transmission of water therethrough and likewise controls the transmission of moisture vapor therethrough. An example of a weather barrier which is well known in the art is Jumbo Tex® Vapor Permeable Weather Resistive Barrier manufactured by Fortifiber® Corporation of Incline Village, Nev., although other similar materials are well known and used in the relevant art.

In one embodiment of the present invention, the weather barrier 4 is comprised of a polymeric material. Preferably, the weather barrier 4 is comprised of a non-woven sheet of polymeric fibers. More preferably, the weather barrier 4 is comprised of a non-woven sheet of polyolefin fibers. Without limitation, the polyolefin fibers that are useful in the preparation of the weather barrier 4 may be selected from polypropylene fibers and high density polyethylene fibers. According to this embodiment, the weather barrier 4, most preferably comprises a non-woven sheet of spun-bonded high density polyethylene fibers.

Non-woven sheets of spun-bonded high density polyethylene fibers are commercially available from E. I. DuPont de Nemours & Co., Inc. (Wilmington, Del.) under the trademarks Tyvek® HomeWrap™, Tyvek® StuccoWrap™ and Tyvek® CommercialWrap™. The non-woven structure provides excellent resistance to water and air penetration. In addition, the non-woven structure has excellent strength and tear resistance.

Figure 1:
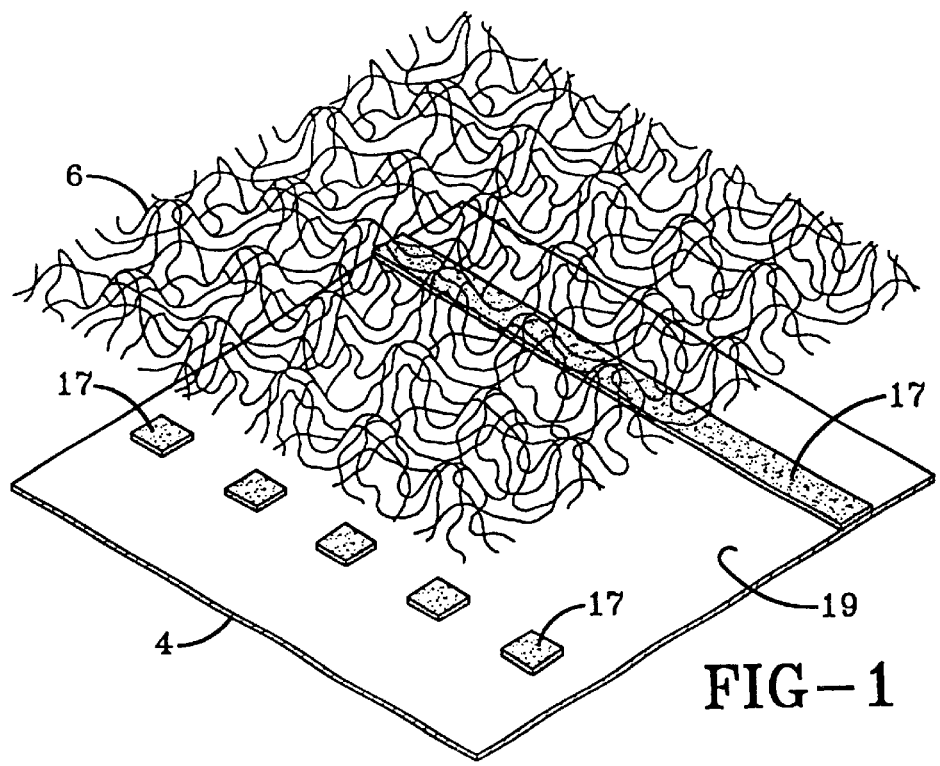
FIG. 1 is an exploded isometric view of a section of the composite building material of the present invention.
Figure 2:
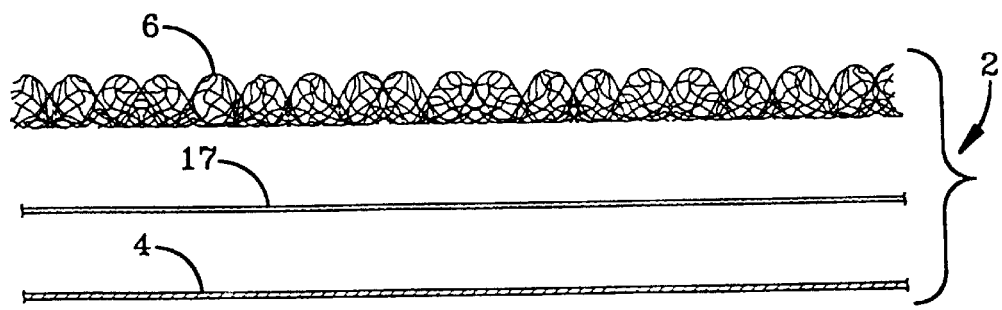
FIG. 2 is an exploded side view of a section of the composite building material of the present invention.

In accordance with the features of the present invention, mat 6 is an open, three-dimensional matrix of filaments which have been laid in overlapping rows of irregularly looped and intermingled fashion and are self-bonded at random points of intersection. The irregular and random intermingling of filaments of mat 6 is best shown in FIG. 1. Mat 6 is preferably manufactured of a thermoplastic polyamide resin such as Nylon 6, although other materials may be used without departing from the spirit of the present invention. Such other materials that can be used to manufacture mat 6 include, but are not limited to, polyolefin fibers, such as polypropylene, high density polyethylene, polyvinylchloride, polystyrene fibers and polyester fibers.

Mat 6 is preferably of a type described and manufactured in accordance with U.S. Pat. Nos. 4,212,692, 3,691,004, and/or 3,687,759, although other configurations are possible.

As is known and understood in the relevant art, the filaments of mat 6 form a peak and valley structure undulating in the longitudinal and/or transverse directions, preferably to provide a waffle-like structure. Due to its filamentatious structure, mat 6 contains a great number of mutually interconnected voids which allow gases and liquids to flow freely therethrough.

The aforementioned structure provides mat 6 with a crush resistance allowing it to withstand a level of compressive load without crushing away the peak and valley configuration thereof. Thus, air and water can still flow directly and transversely through mat 6 even when the mat is under a compressive load. The ability of mat 6 to withstand a given compressive load must necessarily vary with factors such as the filament diameter, the material of which mat 6 is composed, the extent to which self-bonding has occurred, the height of the peaks and valleys, as well as a plurality of other such variables. Thus, the crush-resistant properties of mat 6, while inherent in the design of the mat, vary with numerous parameters regarding the construction of mat 6.

In accordance with the features of the invention, mat 6 is fixedly attached to weather barrier 4. Preferably both weather barrier 4 and mat 6 are elongated strips resulting in composite mat 2 being in strip form and having a longitudinal axis. Furthermore, when joined weather barrier 4 and mat 6 form a single unitary integral composite mat 2 which is easily placed in roll form for transport to a job site. It is preferred that weather barrier 4 and mat 6 be attached to each other with beads of an appropriate adhesive 17, which may be continuous or intermittent, although other methods of attachment, such as heat lamination, are equally applicable and do not depart from the spirit of the present invention. Preferably, a hot melt adhesive is used to bond the weather barrier 4 to mat 6 to form the composite building material 2 of the present invention. Suitable adhesives 17 that may be used to bond the weather barrier 4 to mat 6 include, but are not limited to, acrylic adhesives, styrene acrylic adhesives and aliphatic resin adhesives.

Moreover, it is preferred that any such heat lamination or adhesive 17, or other attachment system not interfere with the ability of gases and liquids to flow through mat 6, as described further below. It is additionally preferred that weather barrier 4 and mat 6 can be selectively detachable from one another without causing damage to either for the purpose of working composite drainage mat 2 around penetrations, openings, and obstructions in the structure such as windows, doors, etc. The amount of adhesive 17 used to bond weather barrier 4 to mat 6 should be an amount sufficient to bond the components together, without interfering with the flow of gases and water through the mat 6.

The adhesive 17 should provide a bond strength such that the weather barrier 4 remains bonded to mat 6 during shipping, handling, storage and installation. Additionally, the adhesive bond should be such that it remains substantially unaffected by normal environmental elements, such as water/moisture, wind, ultra-violet radiation, etc., such as might occur during short-term exposure of the building material 2 prior to installation of the external covering or cladding.

Figure 3:
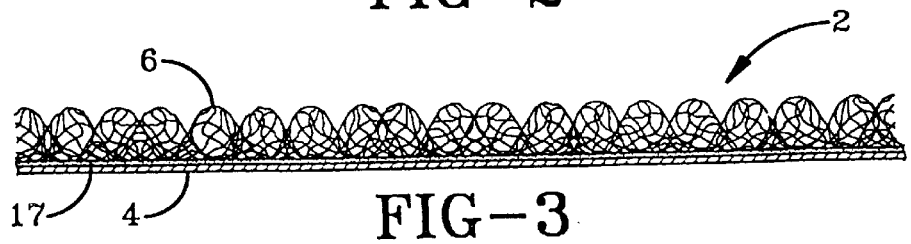
FIG. 3 is a side view of a section of the composite building material of the present invention.
Figure 3A:
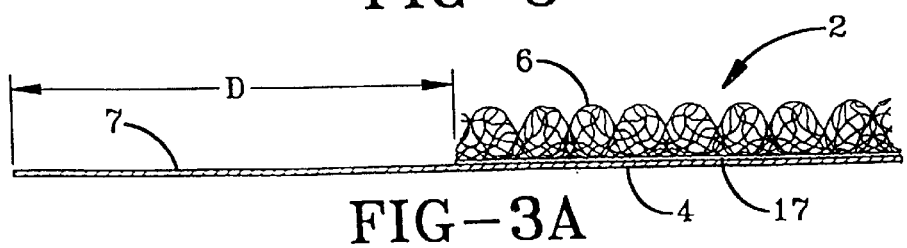
FIG. 3A is a side view of another section of the composite building material of the present invention.
Figure 6:
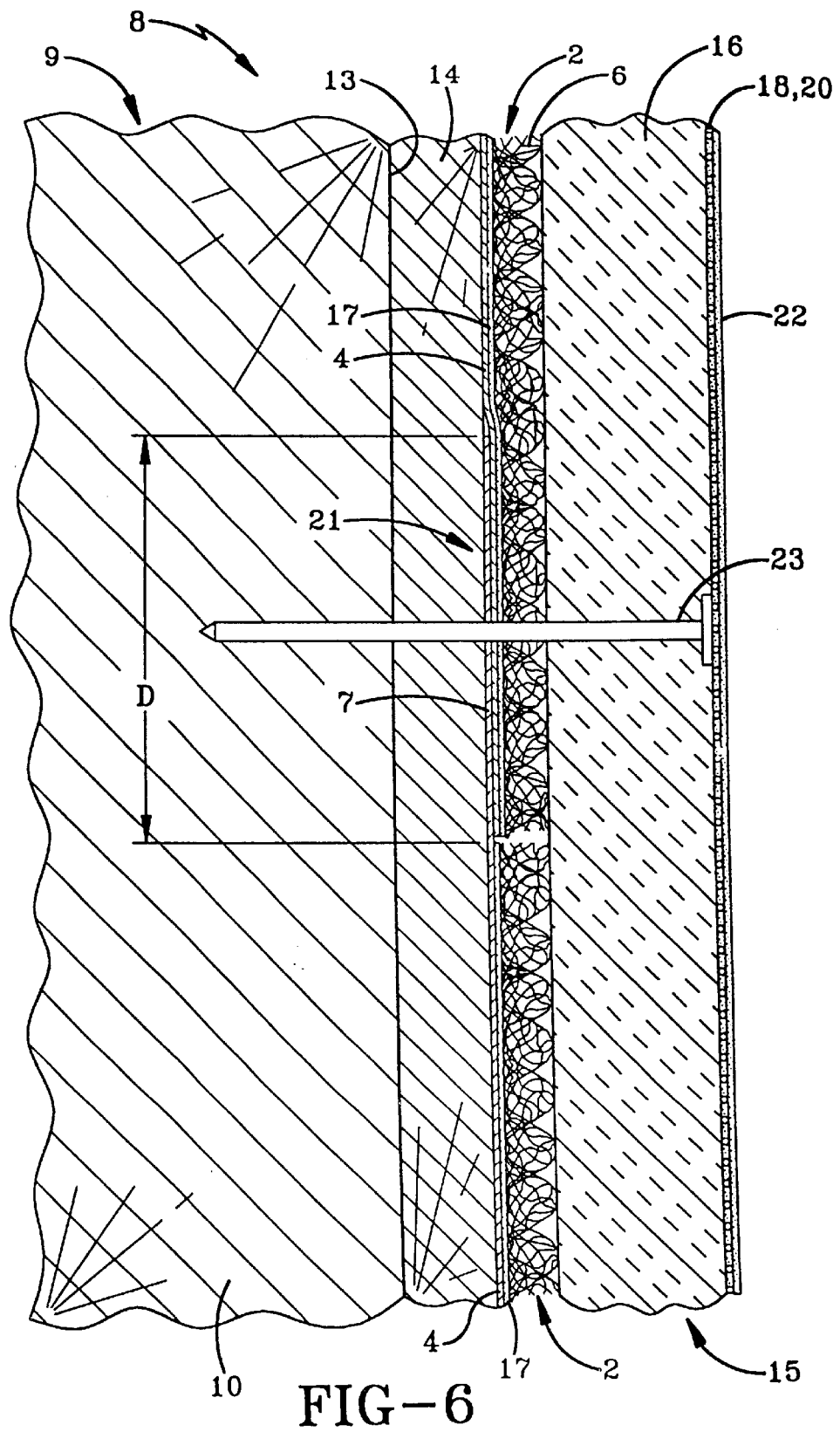
FIG. 6 is a sectional view of another portion of a wall into which is incorporated the composite building material of the present invention.

As is best shown in FIGS. 3A and 6, one edge of weather barrier 4 protrudes beyond the corresponding edge of mat 6 by a distance D to form an overlap strip 7. Weather barrier 4 and mat 6 may terminate flush with each other at all other edges.

Figure 5:
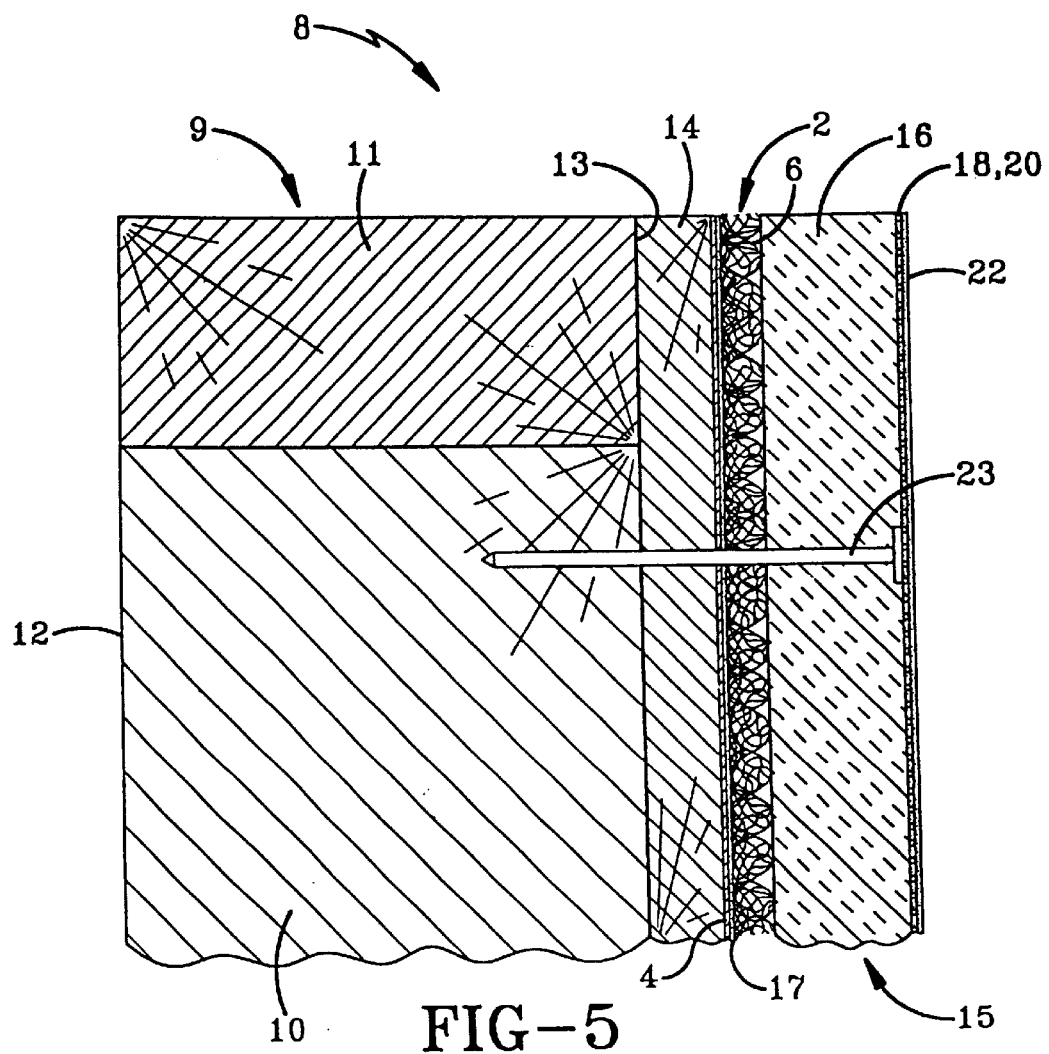
FIG. 5 is a sectional view of the upper part of a wall into which is incorporated the composite building material of the present invention.

One of the suggested environments for composite drainage mat 6 is in conjunction with a wall 8. As is indicated in FIGS. 4–6, wall 8 is of a typical 2×4 frame construction, although other construction techniques and configurations are equally suitable environments for composite building material 2.

Wall 8 is generally constructed of a frame 9, a sheathing 14, composite building material 2, and an external wall covering 15. Frame 9 typically includes a plurality of studs 10, which are members of wood or steel having nominal dimensions of 2"×4". Studs 10 are vertically oriented and are parallel and spaced apart a distance of typically 16" or 24", although these dimensions and parameters are subject to change with building codes and additional learning in the relevant art. Studs 10 are each typically fixedly attached at an upper end to a plate 11, with plate 11 typically being a member of similar dimension to studs 10 and oriented horizontally such that multiple vertical studs 10 in a wall 8 are fixedly attached to a single plate 11. Studs 10 are usually fixedly attached to plate 11 by means of mechanical fasteners such as nails and/or screws (not shown). Moreover, studs 10 are each typically attached to a sill plate (not shown) which is of a similar configuration to plate 11.

Frame 9 additionally contains an interior surface 12 which faces toward the living area and an exterior surface 13 which faces toward the outside environment. As is well known in the relevant art, sheathing 14 is typically fixedly attached to exterior surface 13. Sheathing 14 is typically a sheet of material such as plywood or any of a variety of other materials, some of which may carry building code-oriented designations such as Compliance with APA Document PS1, as well as other designations. While the installation of sheathing 14 might be optional in some circumstances, such circumstances will typically be dictated by applicable building codes. Sheathing 14 is typically attached to exterior surface 13 by mechanical fasteners such as screws, nails, staples, and the like (not shown) and may likewise be fastened with materials such as adhesives, all of which are well known in the relevant art.

Composite building material 2 is then installed onto sheathing 14. If, as indicated above, sheathing 14 is absent from the building construction, composite building material can be applied and fixedly attached directly to exterior surface 13 without departing from the spirit of the present invention, with or without an intermediate support structure. It will be assumed in the discussion hereinafter that the structure includes sheathing 14, as is indicated in FIGS. 4–6.

Composite building material 2 is attached to sheathing 14 with weather barrier 4 directly adjacent sheathing 14 and with mat 6 facing outwardly. Composite building material 2 is fixedly attached to sheathing 14 using any of a variety of fastening systems such as mechanical fasteners like screws, nails, staples, etc., or adhesives (none of which are shown). While a variety of attachment systems may be used to attach composite building material 2 to sheathing 14, it is preferred that such attachment systems create a minimum of holes and/or voids in weather barrier 4 and are of sufficient strength to retain the composite in place until the external wall covering is installed.

Composite building material 2 is anticipated to be provided in rolls, typically in widths between 3 and 4 feet, although substantially any width may be used. It is anticipated that composite building material 2 will be unrolled from the roll and applied so that the longitudinal axis extends horizontally to the structure beginning at the grade level, with overlap strip 7 in the uppermost direction. Inasmuch as wall 8 is expected to be taller than the width of composite building material 2, it is anticipated that additional widths of composite building material 2 will be installed progressively higher on wall 8 with each additional width of composite building material 2 overlapping the corresponding overlap strip 7 of the width below to create a horizontal overlap zone 21. The size of overlap zone 21 is ordinarily mandated by local building codes, and is typically on the order of 2½ inches, although other dimensions are possible. When, during installation, then end of a roll is reached, the terminal end of the roll is preferably to joined to the initial end of another such roll by forming a vertical overlap (not shown). A portion of mat 6 may need to be cut away to achieve the vertical overlap. The vertical overlap is typically on the order of six inches, but such dimensions are usually established and vary with local building codes.

Any water flowing through mat 6 is expected to flow in a generally downwardly direction perpendicular to overlap strip zone 21. Water flowing will flow from an upper width of composite building material 2 over overlap zone 21 and thence onto the corresponding width of composite building material 2 immediately therebelow. Thus, water flowing downward will be prevented from penetrating through composite building material 2 at overlap zone 21.

Moreover, inasmuch as water flows in a downwardly direction through composite building material 2, adhesive 17 is preferably applied in relatively thin beads, either continuous or intermittent, perpendicular to the longitudinal axis of the mat, oriented in the vertical direction, i.e., perpendicular to overlap strip 7, in order to reduce the likelihood that adhesive 17 when in strip form might interfere with the flow of water downwardly through mat 6. The application of adhesive 17 in such a fashion creates a plurality of well-defined flow channels 19 which are unobstructed by adhesive 17 and which permit the downward flow of water therethrough. In the preferred embodiment, adhesive 17 will be in spot form as shown on the left side of FIG. 1, in contrast to the continuous strip as shown on the right side of FIG. 1.

Once composite building material 2 has been attached to sheathing 14, an external wall covering may be installed over composite building material 2. External wall covering 15 is, in the preferred embodiment, an Exterior Insulation and Finish System (EIFS). The EIFS is well known and understood in the relevant art, and is sometimes referred to as "synthetic stucco" as it has largely replaced the conventional stucco system employing lath and stucco plaster. While external wall covering 15 is shown herein to be an EIFS, it should be understood that any of a great variety of materials such as brick, vinyl or aluminum siding, wood, etc., can be used in conjunction with composite building material 2 without departing from the spirit of the present invention.

External wall covering 15 includes a substrate 16, a matrix 18, a binder 20, and a finish coat 22, all of which are well known and understood in the relevant art. Substrate 16 is typically a sheet of stiff, low density material such as polystyrene, although other materials may be used. Matrix 18 is typically a mesh of high-tensile fibers such as fiberglass mesh, although other materials could be used without departing from the spirit of the present invention.

External wall covering 15 is installed by first fixedly attaching substrate 16 directly over composite building material 2 using any of a variety of appropriate attachment systems such as nails 23, although appropriate adhesives may be used without departing from the spirit of the present invention. It is preferred, as is indicated herein before, to minimize the number of voids and/or holes created in weather barrier 4. Nevertheless, if adhesives are used, they must be applied in such quantity to not interfere with the ability of mat 6 to carry and transport gases and fluids therethrough. If nails 23 or other appropriate fasteners such as staples, are used to attach substrate 16 to wall 8, the nails or staples are preferably driven through composite building material 2 and sheathing 14 into studs 10 and/or header 11 in order to provide a sufficient anchoring system. This is best depicted in FIG. 5. It is additionally preferred that the nails or staples 23 be driven into sheathing 14 if it is of a material which can effectively accept fasteners, such as plywood.

In the circumstance involving nailing, nails 23 will cause substrate 16 to be urged toward sheathing 14 with composite drainage mat 6 compressed therebetween. As is indicated hereinbefore, mat 6 of composite building material 2 possesses a crush-resistant character which allows it to withstand a certain level of compressive force without interfering with the free flow of liquids and gases therethrough. As such, mat 6 must be configured to withstand the compressive force of substrate 16 as urged toward sheathing 14 by an appropriate number of nails 23.

Once substrate 16 is fixedly attached to the structure, matrix 18 is installed onto substrate 16 using binder 20. Binder 20 is a material well known and understood in the relevant art having both adhesive and structural properties. Binder 20 is supplied in a dry, semi-liquid or paste form which, when hardens, fixedly attaches matrix 18 to substrate 16 and provides external wall covering 15 with a substantial stiffness and rigidity.

As is well known and understood in the relevant art, matrix 18 is installed onto substrate 16 by first applying a thin coat of binder 20 onto substrate 16 and by then laying matrix 18 into the uncured binder 20. Before the coating of binder 20 has cure d or dried, binder 20 is forced through voids in the mesh of matrix 18. As such, matrix 18 is embedded in binder 20. This is best depicted in FIG. 5. Once binder 20 is cured, finish coat 22 is applied thereto and allowed to dry. The installation of external wall covering 15 is then complete.

As is indicated above, the benefits of installing weather barrier 4 and mat 6 in conjunction with wall 8 are manifold. Mat 6 permits ventilation to occur between external wall covering 15 and weather barrier 4 thereby preventing moisture from remaining trapped therebetween by allowing any such moisture to flow through mat 6 to appropriate drain holes (not shown) constructed in the lower end of wall 8. Moreover, incidental water which may have penetrated through external wall cove ring 15 or through voids formed in the other components of the building envelope such as windows is likewise permitted to be drained away through mat 6 instead of remaining trapped between external wall covering 15 and weather barrier 4.

In accordance with the features of the invention, since composite building material 2 contains weather barrier 4 and mat 6 fixedly attached to one another, both weather barrier 4 and mat 6 are installed in one operation. As is indicated above, in the prior art weather barrier 4 and mat 6 were installed in separate operations requiring significant additional expense and time. Moreover, the additional step required in the prior art to separately install mat 6 increased the potential that the integrity of weather barrier 4 was compromised by additional nails, staples, and the like and by additional material handling. Thus, composite building material 2 provides all of the benefits of having weather barrier 4 and mat 6 integrated into wall 8, and provides for significant cost and time savings.

As is indicated in FIG. 7, and in accordance with the features of the invention, composite building material 2 may additionally be used in conjunction with a roof 24. Roof 24 includes a layer of decking 26, a plurality of shingles 28, and composite building material 2 interposed therebetween. Other constructions and roofing materials are well known and understood in the relevant art and may be used without departing from the spirit of the present invention.

As is well known in the art, roof 24 is constructed by first installing decking 26 onto a plurality of rafters 30 at the upper end of a structure. Composite building material 2 is then placed over decking 26 with weather barrier 4 facing decking 26, with composite building material 2 being attached in place with an appropriate adhesive, mechanical fastener, or other attachment system, as is set forth above. Shingles 28 or other appropriate roofing materials are then installed over composite building material 2 with a similar appropriate fastener system such as nails 32.

Thus, when composite building material 2 is incorporated into roof 24, mat 6 of composite building material 2 permits ventilation between weather barrier 4 and shingles 28 or other such roofing materials, and additionally allows any water which may have penetrated shingles 28 or other such roofing materials to flow through mat 6 and off the edge of roof 24. As such, mat 6 of composite drainage mat prevents water and/or moisture from becoming trapped and remaining trapped between weather barrier 4 and shingles 28 or other such roofing materials.

Accordingly, the improved composite drainage mat is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

I claim:

1. A method for constructing a building structure comprising:

providing a plurality of spaced studs;

securing a sheathing to the studs;

providing a composite building material comprising an integral unitary member including a polymeric weather barrier, a mat formed of an open, three dimensional matrix of plastic filaments formed in an overlapping irregular looped and intermingled fashion and a securement means for attaching the mat to the weather barrier, securing the composite building material to said sheathing; and securing an external covering to the studs with the composite building material being sandwiched between said sheathing and external covering.

2. The method of claim 1 including securing the composite building material to the sheathing with penetrating fasteners.

3. The method of claim 2 in which the penetrating fasteners are nails or staples.

4. The method of claim 1, wherein the building structure is a wall and the studs extend vertically; in which the composite building material is an elongated strip having a greater length than width and having a longitudinal axis; and in which the length of said material extends perpendicular to the vertical studs.

5. The method of claim 4 including overlapping longitudinal edges of adjacent strips of the composite building material wherein an upper weather barrier overlaps an adjacent lower weather barrier.

6. The method of claim 4 including providing the composite building material with spaced parallel strips of an adhesive to secure the plastic filaments to the weather barrier, and wherein said strips extend substantially perpendicular to the longitudinal axis of said building material.

7. The method of claim 1 including providing an elongated edge of the composite building material free of the plastic filaments.

8. The method of claim 1 including forming the weather barrier of a sheet of non-woven polymeric fibers.

9. The method of claim 1 wherein the building structure is a roof and the sheathing is the roof deck and the external covering is a plurality of shingles.

10. The method of claim 1, wherein said securement means is selected from the group consisting of (i) a plurality of spaced adhesive spots (ii) a plurality of substantially parallel adhesive strips and (iii) a lamination.

11. The method of claim 10, wherein said securement means is a plurality of spaced adhesive spots.

12. The method of claim 1, wherein the adhesive is a plurality of substantially parallel adhesive strips.

13. The method of claim 12, wherein said composite building material is an elongated strip having a longitudinal axis; and in which the adhesive strips extend generally perpendicular to said longitudinal axis.

14. The method of claim 10, wherein the securement means is a lamination.

15. A building structure comprising:

a framed wall comprising a plurality of spaced studs;

a composite building material comprising an integral unitary member including a polymeric weather barrier, a mat formed of an open, three dimensional matrix of plastic filaments formed in an overlapping irregular looped and intermingled fashion and a securement means for attaching the drainage mat to the weather barrier, wherein said building material is fixedly attached to said spaced studs; and an external covering fixedly attached to said spaced studs with the composite building material being disposed between said framed wall and external covering.

16. The building structure of claim 15, wherein said mat is selectively detachable from said weather barrier, said mat and said weather barrier remaining undamaged after said mat is detached from said weather barrier.

17. The building structure of claim 15, wherein the weather barrier comprises a non-woven sheet of spun-bonded olefin fibers.

18. The building structure of claim 15, wherein the olefin fibers are selected from the group consisting of polypropylene fibers and high density polyethylene fibers.

19. The composite building material of claim 18, wherein the olefin fibers are high density polyethylene fibers.

20. The building structure of claim 15, wherein the plastic filaments of the mat are nylon.

21. The building structure of claim 20, wherein the nylon filaments are nylon 6.

22. The building structure of claim 15, wherein said securement means is selected from the group consisting of (i) a plurality of spaced adhesive spots (ii) a plurality of substantially parallel adhesive strips and (iii) a lamination.

23. The building structure of claim 22, wherein said securement means is a plurality of spaced adhesive spots.

24. The building structure of claim 15, wherein the adhesive is plurality of substantially parallel strips.

25. The building structure of claim 24, wherein said composite building material is an elongated strip having a longitudinal axis; and in which the adhesive strips extend generally perpendicular to said longitudinal axis.

26. The building structure of claim 15, wherein the securement means is a lamination.

27. A method for constructing a building structure comprising:

forming a framed wall with a plurality of spaced studs;

providing a composite building material comprising an integral unitary member including a polymeric weather barrier, a mat formed of an open, three dimensional matrix of plastic filaments formed in an overlapping irregular looped and intermingled fashion and a securement means for attaching the drainage mat to the weather barrier, securing the composite building material to said spaced studs of said framed wall; and securing an external covering to the studs with the composite building material being disposed between said framed wall and external covering.

* * * * *

UNITED STATES PATENT AND TRADEMARK OFFICE
CERTIFICATE OF CORRECTION

PATENT NO. : 6,804,922  
APPLICATION NO. : 10/163730  
DATED : October 19, 2004  
INVENTOR(S) : Egan et al.

Page 1 of 1

It is certified that error appears in the above-identified patent and that said Letters Patent is hereby corrected as shown below:

Title Page [75] Inventor: should read,

-- William F. EGAN, Ponte Vedra Beach, FL (US)  
Curtis MCCORSLEY, Asheville, NC (US)  
James R. KEENE, Pepper Pike, OH (US) --

Signed and Sealed this

Seventeenth Day of April, 2007

JON W. DUDAS  
*Director of the United States Patent and Trademark Office*